(12) United States Patent
Gralka et al.

(10) Patent No.: US 11,919,575 B2
(45) Date of Patent: Mar. 5, 2024

(54) FIBER COMPOSITE BODY AND METHOD FOR PRODUCING A FIBER COMPOSITE BODY

(71) Applicant: Bayerische Motoren Werke Aktiengesellschaft, Munich (DE)

(72) Inventors: Richard Gralka, Gotha (DE); Thomas Hogger, Otterfing (DE); Falco Hollmann, Garching (DE); Joachim Starke, Munich (DE); Bernhard Staudt, Munich (DE); Michael Voelke, Ergolding (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 505 days.

(21) Appl. No.: 15/734,941

(22) PCT Filed: May 28, 2019

(86) PCT No.: PCT/EP2019/063708
§ 371 (c)(1),
(2) Date: Dec. 3, 2020

(87) PCT Pub. No.: WO2019/243001
PCT Pub. Date: Dec. 26, 2019

(65) Prior Publication Data
US 2021/0229757 A1    Jul. 29, 2021

(30) Foreign Application Priority Data

Jun. 21, 2018  (DE) .................. 10 2018 210 119.1

(51) Int. Cl.
*B29C 70/20* (2006.01)
*B29C 70/46* (2006.01)
(Continued)

(52) U.S. Cl.
CPC .............. *B62D 29/04* (2013.01); *B29C 70/46* (2013.01); *B62D 27/00* (2013.01); *C08J 5/24* (2013.01); *B29C 70/22* (2013.01)

(58) Field of Classification Search
None
See application file for complete search history.

(56) References Cited

U.S. PATENT DOCUMENTS 4,056,645 A * 11/1977 Henry .................... B60V 1/16
                                                                 180/128
2005/0115186 A1   6/2005 Jensen et al.
2014/0021747 A1   1/2014 Goettker et al.

FOREIGN PATENT DOCUMENTS

CN        1464934 A    12/2003
CN      102463678 A     5/2012
(Continued)

OTHER PUBLICATIONS

Machine translation of DE19527197 (Year: 2023).*
(Continued)

*Primary Examiner* — Alexander S Thomas
(74) *Attorney, Agent, or Firm* — Crowell & Moring LLP

(57) ABSTRACT

A fiber composite body, in particular a structure stiffening element, has a number of struts which are formed by reinforcing fibers which are embedded in a polymer matrix and which in a region of the respective strut run substantially parallel to one another. The struts are arranged in a truss-like profiled structure which is produced by winding or intertwining the reinforcing fibers.

5 Claims, 5 Drawing Sheets

(51) Int. Cl.
  *B62D 27/00*  (2006.01)
  *B62D 29/04*  (2006.01)
  *C08J 5/24*   (2006.01)
  *B29C 70/22*  (2006.01)

(56) References Cited

FOREIGN PATENT DOCUMENTS

| CN | 102596546 A | 7/2012 |
| CN | 102734288 A | 10/2012 |
| CN | 104626603 A | 5/2015 |
| CN | 105636804 A | 6/2016 |
| CN | 105754285 A | 7/2016 |
| CN | 107074285 A | 8/2017 |
| DE | 195 27 197 A1 | 1/1997 |
| DE | 10 2009 043 103 A1 | 3/2011 |
| DE | 10 2013 208 278 A1 | 11/2014 |
| DE | 10 2013 219 820 A1 | 4/2015 |
| DE | 10 2016 012 534 A1 | 4/2017 |
| DE | 10 2016 013 599 A1 | 5/2017 |
| DE | 10 2016 012 594 A1 | 6/2017 |
| DE | 10 2016 111 468 A1 | 12/2017 |
| DE | 10 2018 105 280 A1 | 9/2018 |
| EP | 1 500 578 A2 | 1/2005 |
| JP | 2005-144902 A | 6/2005 |

OTHER PUBLICATIONS

PCT/EP2019/063708, International Search Report dated Aug. 20, 2019 (Two (2) pages).
German Search Report issued in German application No. 10 2018 210 119.1 dated Sep. 21, 2018, with Statement of Relevancy (Nine (9) pages).
English-language Chinese Office Action issued in Chinese application No. 201980027169.7 dated Oct. 29, 2021 (Ten (10) pages).

* cited by examiner

FIBER COMPOSITE BODY AND METHOD FOR PRODUCING A FIBER COMPOSITE BODY

BACKGROUND AND SUMMARY OF THE INVENTION

The invention relates to a fiber composite body, in particular to a structure-stiffening element, and to a method for producing a fiber composite body, in particular a structure-stiffening element.

Fiber-reinforced plastics have a high lightweight construction potential and, by virtue of the incorporated fibers, can take up high tensile forces. Here, the weight-specific advantages of fiber-reinforced plastics can best be used if the fibers in the matrix material run along the load paths, which requires a loading-appropriate construction of the component.

DE 10 2013 219 820 A1, for example, discloses a fiber composite component which is used as a vehicle body component, for example a cowl of a vehicle. The fiber composite component has a plurality of elongate fiber bundles which are embedded in a plastic matrix and form a profile and between which there are arranged bracing means which are created in particular by injection-molding a plastics material onto the profile.

Also known are structural components which are produced with a shell construction consisting of (reinforced) plastic, with a steel construction or by aluminum extrusion.

The object on which the invention is based is to provide a fiber composite body which is distinguished by a low weight, cost-effective manufacture and high stability, and a method for producing the body.

This object is achieved by a fiber composite body, in particular a structure-stiffening element, having a plurality of struts which are formed by reinforcing fibers which are embedded in a plastic matrix and which run substantially parallel to one another in the region of the respective strut, wherein the struts are arranged in a trusslike profile structure which is created by wrapping or by stitching the reinforcing fibers. Here, the reinforcing fibers, which can be carbon, glass or aramid fibers, form fiber bundles in the region of the individual struts, as a result of which a loading-appropriate construction of the fiber composite body is achieved. The direct wrapping of the reinforcing fibers achieves a particularly low weight. The wrapping technique, in which the fibers run exclusively in the loading direction of the individual struts and in which only as many fibers are used as are necessary at a concrete point, is even distinguished by the highest lightweight construction potential of all fiber composite technologies. Alternatively thereto, the trusslike profile structure can be created by stitching the reinforcing fibers to a carrier material (preferably a textile, for example a glass fiber or carbon fiber textile). The carrier material together with the reinforcing fibers can be configured in the manner of a strip, with the result that this strip is then laid or wrapped like the individual fibers. Alternatively thereto, the carrier material is a large-area textile into which the reinforcing fibers are stitched according to the orientation of the struts. The gaps in the fiber composite body between the struts are already prepared by cutting out the large-area textile. In other words, first of all a type of two-dimensional structure of the fiber composite body is formed by means of the carrier material with reinforcing fibers, and then this two-dimensional structure is embedded in a plastic matrix. The carrier material can then optionally also be at least partially removed mechanically. Moreover, thanks to low investment costs, the fiber composite body according to the invention can be produced in a cost-effective manner in molds and the like.

The profile structure is preferably created by directly wrapping reinforcing fibers preimpregnated with the matrix material and then pressing. Here, the plastic matrix, which can consist of thermoplastic or thermoset material, forms an integrally bonded connection during the compression of the preimpregnated fibers. There results a simple and inexpensive production method for the fiber composite material according to the invention that is distinguished in particular by low tool costs.

The entire profile structure is advantageously formed by wrapped reinforcing fibers embedded in a plastic matrix. Unlike in the case of known fiber composite bodies in which so-called fiber bars having elongate reinforcing fibers are provided only along the main load paths, whereas the braces arranged therebetween are created by molding on plastics material, optionally enriched with short fibers, in the fiber composite body according to the invention all the struts are formed by wrapped reinforcing fibers, that is to say in particular also the short "braces" which extend between the longer struts arranged along the main loading directions. This results in a particularly lightweight component which is distinguished by a high multiaxial loadability.

A lightweight and at the same time highly loadable construction can be achieved if the reinforcing fibers are endless fibers of which at least one fraction extends over a plurality of struts. Even the wrapping of the entire profile structure from a single endless fiber bundle is theoretically conceivable.

In order to achieve a simple-to-manufacture and at the same time stable profile structure it is possible, in a transition region between two struts, for at least one fraction of the reinforcing fibers to leave a bundle orientation of the one strut and transition into a fiber reinforcement of the other strut.

In a preferred embodiment, connection points at which the reinforcing fibers intersect are provided between intersecting struts, in particular wherein the reinforcing fibers of each strut form a reinforcing fiber bundle and the reinforcing fiber bundles penetrate one another at the connection points. For example, one bundle can be guided centrally through the other bundle or both bundles are divided into a plurality of layers which intersect in alternating fashion. Since the intersecting bundles are also compressed with one another at the connection points, the plastic matrix of the (preimpregnated) fiber bundles here also forms an integrally bonded connection.

In a development of the invention, one or more attachment regions for fastening the fiber composite body to a neighboring part are provided which each have a fastening element around which the reinforcing fibers extend. This makes it possible to achieve a loadable, favorable and simple-to-produce connection between the fiber composite body and other components, with it being possible to dispense with a stability-impairing change in the structure of the fiber composite body, as would be the case for instance with subsequent drilling of a hole.

The fastening element preferably comprises a fastening opening which is surrounded in particular by an insert, preferably in the form of a sleeve, around which the reinforcing fibers are guided. The insert, which can in particular be made of metal, is already inserted or enwrapped with the wrapping of the profile structure and thereby facilitates the fiber guiding of the reinforcing fibers which in particular surround the insert in loop form. As an alternative to a sleeve, a threaded bush, a threaded bolt, a bolt, an eye or the like is of course also possible.

Furthermore, there can be provision that the insert has an anchoring means, in particular in the form of an integrally formed plate. Such an anchoring means, which is preferably of flat configuration, allows forces which are introduced as point forces via the fastening element or the insert to be distributable over an area in the fiber composite body.

In a development, in a transition region between a strut and an attachment region, one fraction of the reinforcing fibers is crossed with another fraction of the reinforcing fibers. This achieves increased stability precisely in the attachment regions of the fiber composite body according to the invention, which can thus be loaded not only in tension but also very well in compression.

The object presented above is also achieved by a method for producing a fiber composite body having a plurality of struts which are arranged in a trusslike profile structure, wherein the method comprises the following steps:
  a) providing preimpregnated endless reinforcing fibers;
  b) wrapping a trusslike profile structure from the preimpregnated reinforcing fibers or stitching reinforcing fibers into a carrier material, wherein each strut is formed by a plurality of reinforcing fibers running parallel to one another;
  c) inserting the wrapped reinforcing fibers into a compression mold; and
  d) compressing the wrapped reinforcing fibers to form the finished fiber composite body.

The method according to the invention makes it possible in a simple and cost-effective manner for particularly lightweight and at the same time stable fiber composite bodies with a trusslike profile structure to be produced which can in particular be used as structure-stiffening elements in motor vehicle bodybuilding.

Moreover, all the developments and advantages which have been stated with respect to the fiber composite body according to the invention also apply to the method according to the invention, and vice versa.

Further features and advantages will become apparent from the following description of a number of preferred embodiments with reference to the attached drawings.

DETAILED DESCRIPTION OF THE DRAWINGS

Figure 1:
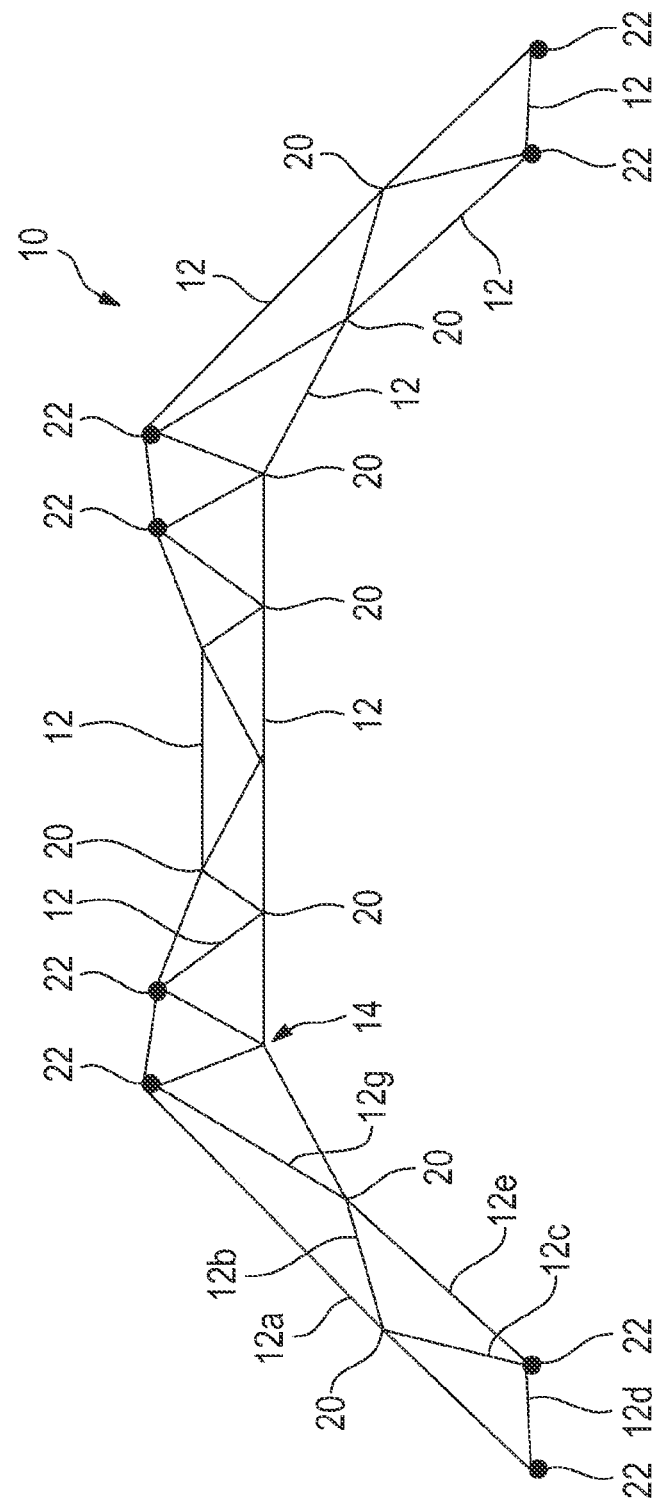
FIG. 1 shows a schematic illustration of a profile structure of a fiber composite body according to a first embodiment of the invention.
Figure 2:
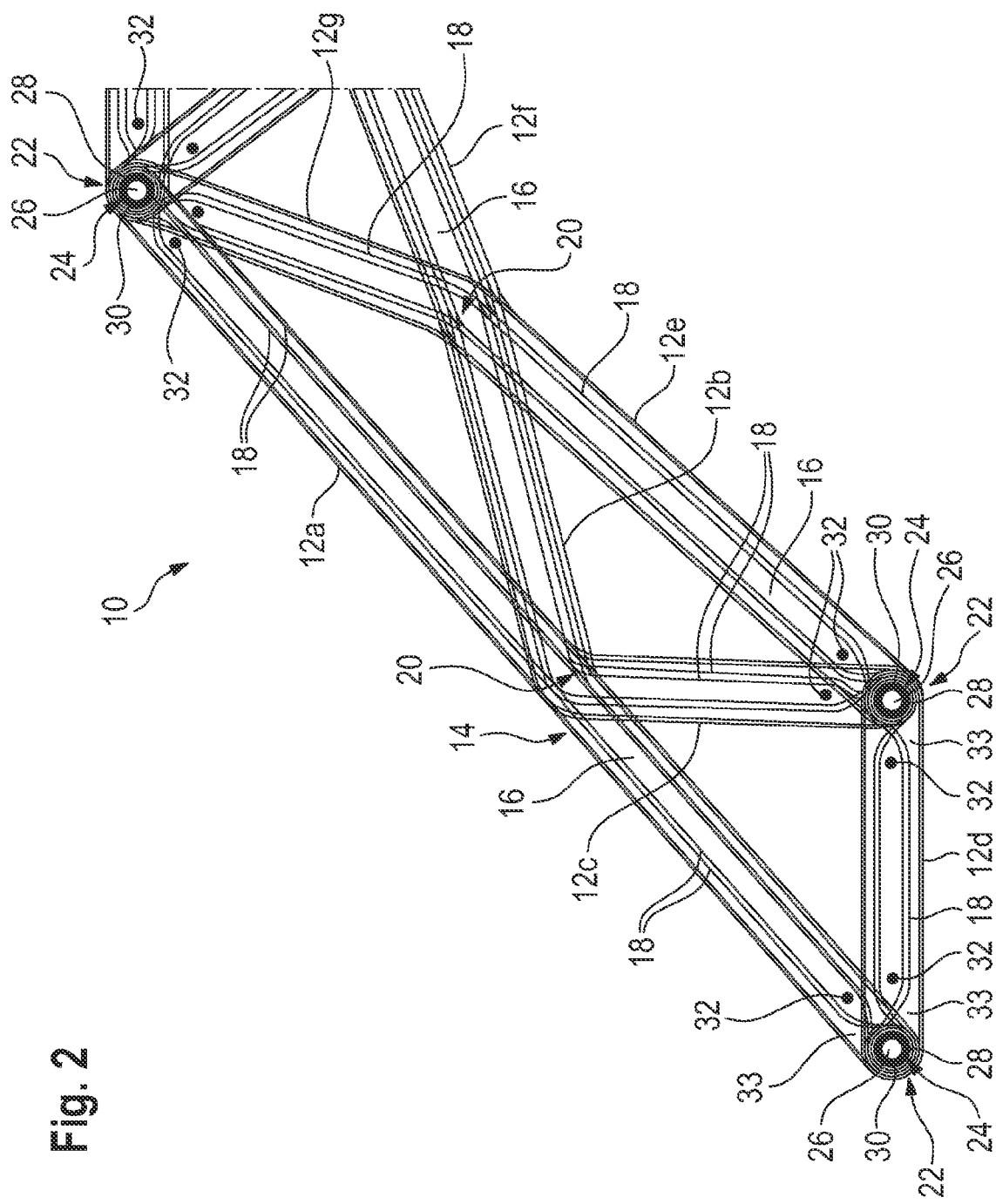
FIG. 2 shows an illustration of the orientation of the reinforcing fibers in a subregion of the fiber composite body from FIG. 1.

FIGS. 1 and 2 show a fiber composite body 10 according to the invention in the form of a structure-stiffening element which serves in particular for stiffening the body of a motor vehicle.

The fiber composite body 10, which is of flat configuration here and extends substantially in two dimensions, namely in the drawing plane, has a plurality of struts 12 which are arranged in a trusslike profile structure 14. As can be seen from FIG. 2, the struts 12 are formed by reinforcing fibers 18 which are embedded in a plastic matrix 16 and which for the most part run parallel to one another in the region of the respective strut 12.

It should be pointed out that, in the course of this application, a strut is to be understood as meaning any individual rectilinearly running portion of the profile structure 14, that is to say not only the longer portions arranged along the main load directions, but also the shorter "braces" arranged therebetween, which are also referred to as transverse braces because they extend transversely with respect to the main load directions.

Here, the entire trusslike profile structure 14 is created by reinforcing fibers 18 which are embedded in the plastic matrix 16 in that the reinforcing fibers 18 preimpregnated with the matrix material are directly wrapped and then compressed. The reinforcing fibers 18 are endless fibers of which at least one fraction extends over a plurality of struts 12, for example 12a and 12b, 12a and 12c, 12e and 12g, 12e and 12f, 12b and 12f. It is even conceivable that the entire structure is wrapped from a single endless fiber bundle.

Transition regions 20, also referred to as nodes, are provided between in each case two (or more) struts 12 (for example 12a, 12b and 12c, 12e, 12f, 12g and 12b, etc., in FIG. 2), wherein, in a transition region 20, at least one fraction of the reinforcing fibers 18 leaves the bundle orientation of the one strut (for example 12a) and transitions into the fiber reinforcement of the other strut (for example 12b). In particular, bundles of struts which run in the main load direction (struts on the outside) run into transverse struts.

Furthermore, the fiber composite body 10 has a plurality of attachment regions 22 for fastening the fiber composite body 10 to a neighboring part (not shown), wherein the attachment regions 22 each have a fastening element 24 around which the reinforcing fibers 18 extend. Each fastening element 24 comprises a fastening opening 26 which is surrounded by a sleeve 28 which forms part of an insert 30 around which the reinforcing fibers 18 are guided. In the example shown, the inserts 30 are made of metal; alternatively, inserts 30 made of plastic are also possible.

In order to securely anchor the inserts 30 in the fiber composite body 10, each insert 30 has an anchoring means in the form of an integrally formed plate, which in FIG. 2 extends substantially parallel to the drawing plane between a plurality of layers of reinforcing fibers 18, but is not illustrated in the Figure.

In addition, each insert 30 has one or more pinlike extensions 32 which are connected to the plate at a distance from the sleeve 28, wherein a fraction of the reinforcing fibers 18 belonging to the respective strut 12 is crossed with another fraction of the reinforcing fibers 18 between the respective extension 32 and the sleeve 28. This achieves a particularly high stability of the fiber composite body 10 precisely in the transition regions 33 between the struts 12 and the attachment regions 22. In particular, the struts 12 or the entire profile structure 14 can be loaded not only in tension but also very well in compression.

To manufacture the fiber composite body 10, first of all preimpregnated endless reinforcing fibers are provided which are then wrapped according to a specific wrapping plan to form the trusslike profile structure 14, for instance in a wrapping tool. Here, each individual strut 12 of the profile structure 14 is formed by a plurality (a bundle) of reinforcing fibers 18 running parallel to one another. Here, the inserts 30 can serve as winding aids and are enwrapped concomitantly directly with the wrapping of the profile structure 14. Finally, the wrapped reinforcing fibers 18 (together with inserts 30) are inserted into a compression mold and compressed to form the finished fiber composite body 10, wherein the inserts 30 are connected to the remainder of the fiber composite body 10 in a form-fitting and/or integrally bonded manner (the latter in the case of plastic inserts). An encapsulation of the reinforcing fibers 18 by injection-molding does not take place in the method according to the invention.

Figure 3:
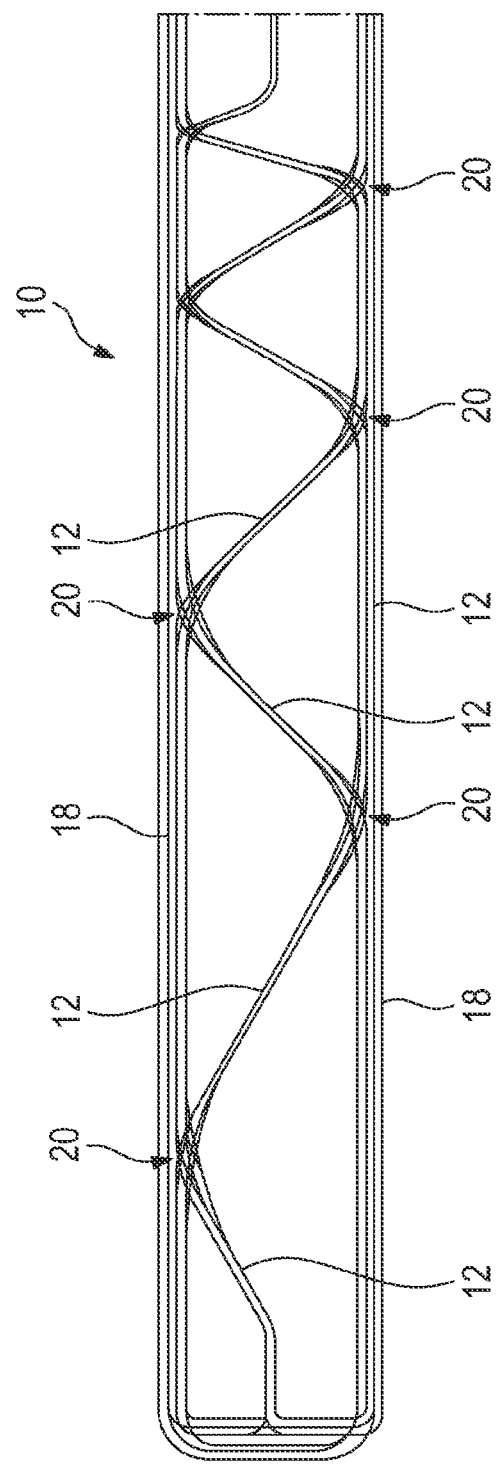
FIG. 3 shows a side view of the reinforcing fiber orientation in a fiber composite body according to a second embodiment of the invention.

FIG. 3 shows a detail view of the orientation of the reinforcing fibers 18 in a fiber composite body 10 in a slightly modified embodiment. There can be seen particularly clearly here the transition regions 20 in each of which a fraction of the reinforcing fibers 18 leaves a bundle orientation of the one strut 12 and transitions into the fiber reinforcement of another strut 12.

Figure 4:
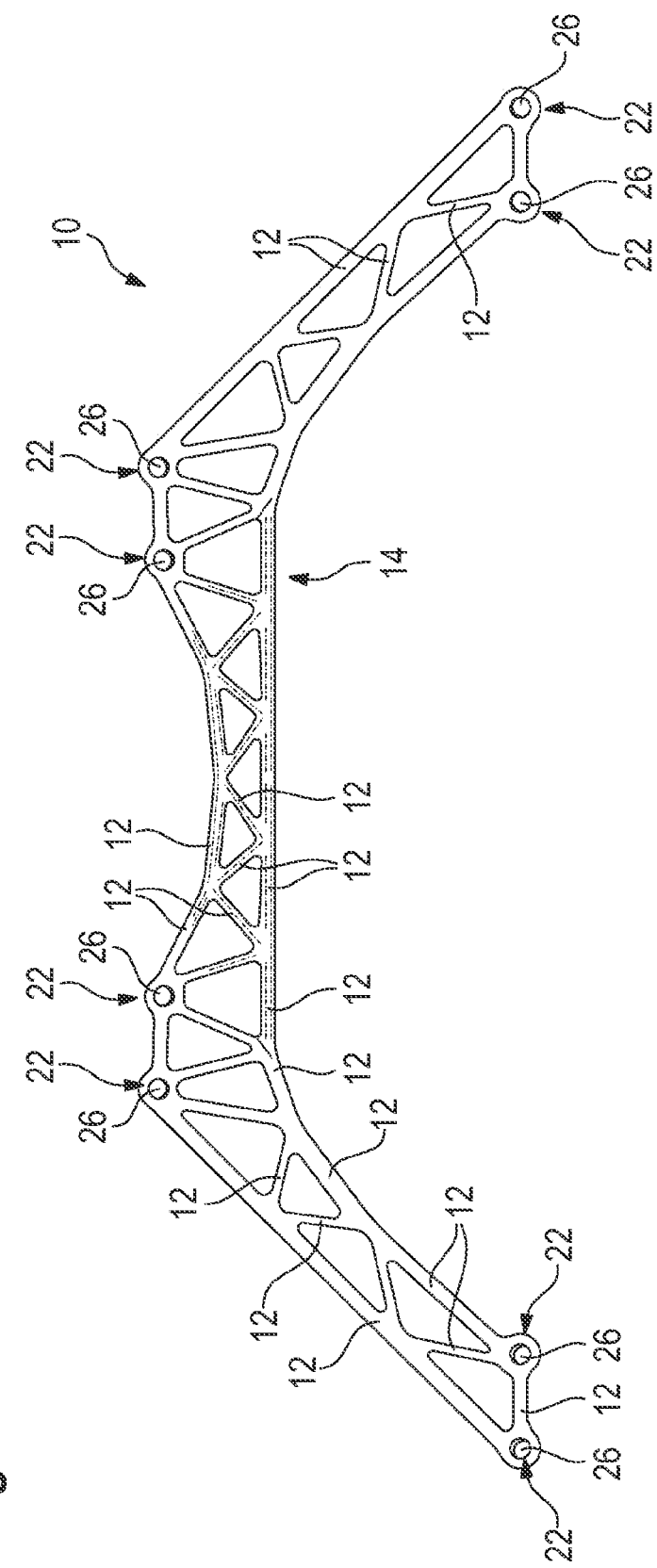
FIG. 4 shows a side view of a fiber composite body according to a third embodiment of the invention.

A further fiber composite body 10 which differs only slightly from that of FIGS. 1 and 2 is shown in FIG. 4. Here, the trusslike profile structure 14 has more short struts 12 which extend between the long struts 12 arranged along the main load directions, which has a positive effect on the stability of the fiber composite body 10.

Figure 5:
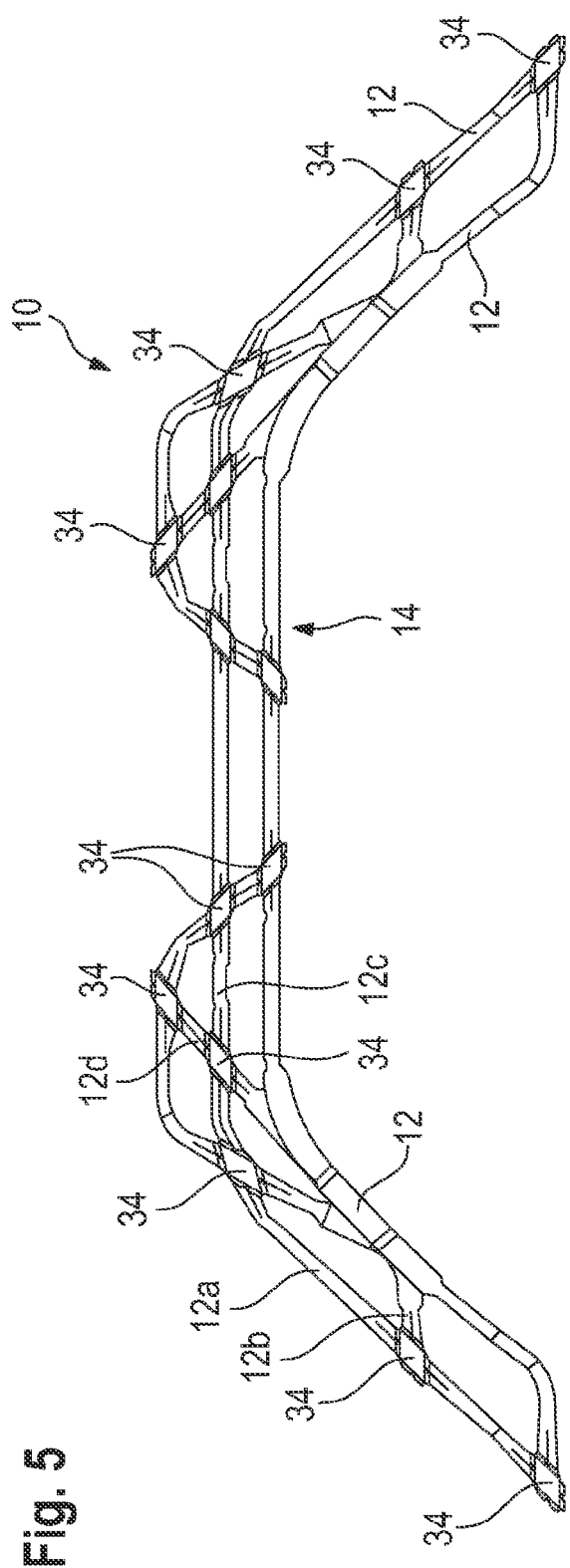
FIG. 5 shows a side view of a fiber composite body according to a fourth embodiment of the invention.

A further embodiment of a fiber composite body 10 according to the invention is shown in FIG. 5, with it also being the case here that identical components bear the same reference signs and only the differences from the previously described embodiments will be discussed.

In the fiber composite body 10 according to FIG. 5, a plurality of struts (for example 12a and 12b, 12c and 12d, etc.) intersect directly, with connection points 34 at which the reinforcing fibers 18 intersect being provided between the intersecting struts 12. In particular, the reinforcing fibers 18 of each strut 12 form a reinforcing fiber bundle, and the reinforcing fiber bundles of two struts 12 penetrate one another at the connection points 34. Here, one bundle can be guided centrally through the other, or both bundles are divided into a plurality of layers which intersect in alternating fashion.

The preimpregnated reinforcing fibers 18 can be compressed with one another somewhat more at the connection points 34 (or "nodes") than in the central regions of the struts 12, as a result of which flat connection points 34 and a particularly high stability can be achieved. It is of course also possible for the fiber composite body 10 according to FIG. 5 to have a plurality of attachment regions with fastening openings, although these are not shown here.

Figure 6:
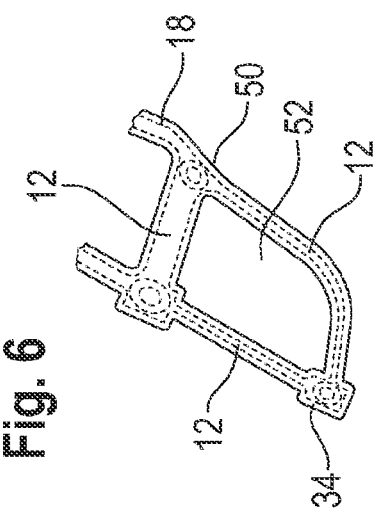
FIG. 6 shows a side view of a further embodiment of the invention with a stitched reinforcing insert.

A further embodiment of the invention is provided in FIG. 6. Here, a carrier material 50 composed of a glass fiber textile or a carbon fiber textile is embroidered by means of reinforcing fibers 18, as have already been mentioned above. The carrier material 50 can be a nonwoven, for example. The carrier material 50 is cut off for embroidering (for example by punching, cutting, including laser cutting) in such a way that clearances 52 and struts 12 are produced. Between the struts 12 there can also be connection points 34 here in which the density of the reinforcing fibers 18 is higher. The increased density can occur by repeatedly embroidering or stitching patterns or the like. The reinforcing fibers 18 can be preimpregnated or else not. If they are not preimpregnated, the flat basic shape, as is illustrated in FIG. 6, is embedded in a plastic matrix and compressed in a mold. Excess carrier material 50 can be removed by a machining method or by laser cutting. Alternatively, the carrier material can be in the form of a strip which is then embroidered. The strip is then wrapped, for example as is shown in FIGS. 1 to 5.

What is claimed is:

1. A fiber composite body, comprising
a plurality of struts, wherein the plurality of struts are formed by reinforcing fibers which are embedded in a plastic matrix and which run substantially parallel to one another in a region of a respective strut;
wherein the plurality of struts are arranged in a profile structure which is formed by wrapping or stitching the reinforcing fibers; and
an attachment region where a first strut of the plurality of struts intersects with a second strut of the plurality of struts, wherein the attachment region has a fastening element around which the reinforcing fibers extend;
wherein the fastening element has a fastening opening which is surrounded by a sleeve which forms part of an insert and wherein the reinforcing fibers are guided around the insert;
wherein the insert has an integrally formed plate;
wherein the insert has a first extension which is connected to the plate at a first distance from the sleeve and a second extension which is connected to the plate at a second distance from the sleeve, wherein a fraction of the reinforcing fibers belonging to the first strut is crossed with another fraction of the reinforcing fibers belonging to the first strut between the first extension and the sleeve, and wherein a fraction of the reinforcing fibers belonging to the second strut is crossed with another fraction of the reinforcing fibers belonging to the second strut between the second extension and the sleeve.

2. The fiber composite body according to claim 1, wherein the profile structure is formed by wrapping the reinforcing fibers and then pressing the wrapped reinforcing fibers.

3. The fiber composite body according to claim 1, wherein the reinforcing fibers are endless fibers and wherein at least a fraction of each of the endless fibers extends over respective adjacent struts of the plurality of struts.

4. The fiber composite body according to claim 1, wherein, in a transition region between a first strut and a second strut of the plurality of struts, at least one fraction of the reinforcing fibers leaves a bundle orientation of the first strut and transitions into a fiber reinforcement of the second strut.

5. The fiber composite body according to claim 1, wherein a respective connecting point is provided between interconnecting struts of the plurality of struts and wherein at the connecting point the respective reinforcing fibers of the interconnecting struts are formed as respective reinforcing fiber bundles that penetrate one another.

* * * * *